United States Patent
Raja et al.

(10) Patent No.: US 9,762,645 B2
(45) Date of Patent: Sep. 12, 2017

(54) MODIFYING DATA COLLECTION SYSTEMS RESPONSIVE TO CHANGES TO DATA PROVIDING SYSTEMS

(71) Applicants: Antony Raja, Karnataka (IN); Samual Kirsh, Chennai/Tamil Nadu (IN); Sudeep Khemka, Karnataka (IN)

(72) Inventors: Antony Raja, Karnataka (IN); Samual Kirsh, Chennai/Tamil Nadu (IN); Sudeep Khemka, Karnataka (IN)

(73) Assignee: SAP SE, Walldorf (DE)

( * ) Notice: Subject to any disclaimer, the term of this patent is extended or adjusted under 35 U.S.C. 154(b) by 719 days.

(21) Appl. No.: 13/800,045

(22) Filed: Mar. 13, 2013

(65) Prior Publication Data

US 2014/0280742 A1     Sep. 18, 2014

(51) Int. Cl.
*G06F 15/16* (2006.01)
*H04L 29/08* (2006.01)
(Continued)

(52) U.S. Cl.
CPC ........ *H04L 67/02* (2013.01); *G06F 17/30634* (2013.01); *G06Q 50/01* (2013.01); *H04L 67/2804* (2013.01); *H04L 67/2823* (2013.01)

(58) Field of Classification Search
CPC ............... H04L 29/08072; H04L 29/06; H04L 29/0809; H04L 29/08117; H04L 67/02;
(Continued)

(56) References Cited

U.S. PATENT DOCUMENTS 7,216,121 B2 *  5/2007  Bachman ........... G06F 17/30864
7,844,484 B2 * 11/2010  Arnett ...................... G06F 21/31
                                                              705/7.31
(Continued)

OTHER PUBLICATIONS

"Spelling correction as an iterative process that exploits the collective knowledge of web users", Silviu Cucerzan and Eric Brill, 2004. <http://www.anthology.aclweb.org/W/W04/W04-3238.pdf>.*
(Continued)

*Primary Examiner* — Joseph E Avellino
*Assistant Examiner* — Patrick Ngankam
(74) *Attorney, Agent, or Firm* — Fish & Richardson P.C.

(57) ABSTRACT

Modifying data collection systems responsive to changes to data providing systems. When a data collection system receives a failure message from a data providing system in response to transmitting a data collection query, the data providing system can notify a data query evaluation system. The evaluation system can create a local version of the collection system and search computer-readable storage media for a modified data collection query. The evaluation system can execute the local version to provide the modified data collection query to the providing system. If the local version receives a success message in response to providing the modified data collection query, then an execution state of the local version is provided to the collection system. If the local version receives a failure message, then the data query evaluation system iteratively performs refined searches of different computer-readable storage media until the modified data collection query is identified.

15 Claims, 3 Drawing Sheets

(51) Int. Cl.
*G06F 17/30* (2006.01)
*G06Q 50/00* (2012.01)

(58) Field of Classification Search
CPC ........ G06Q 30/02; G06Q 50/01; G06F 17/30;
G06F 17/30634
USPC .............................................. 709/219; 707/3
See application file for complete search history.

(56) References Cited

U.S. PATENT DOCUMENTS

| | | | | |
|---|---|---|---|---|
| 7,882,098 B2* | 2/2011 | Prahlad | ............. | G06F 17/30442 |
| | | | | 707/706 |
| 8,321,431 B2* | 11/2012 | Quick | ................ | G06F 17/3087 |
| | | | | 707/754 |
| 2006/0085391 A1* | 4/2006 | Turski | ................ | G06F 17/3097 |
| 2012/0197963 A1* | 8/2012 | Bouw | ............... | G06F 17/30569 |
| | | | | 709/202 |
| 2014/0006371 A1* | 1/2014 | Richardson | ......... | G06F 17/3064 |
| | | | | 707/706 |

OTHER PUBLICATIONS

U.S. Appl. No. 13/593,784, filed Aug. 24, 2012 entitled "Model-Based Backend Service Adaptation of Business Objects", 35 pages.

\* cited by examiner

MODIFYING DATA COLLECTION SYSTEMS RESPONSIVE TO CHANGES TO DATA PROVIDING SYSTEMS

TECHNICAL FIELD

The present disclosure relates to software, computer systems, and computer-implemented media for collecting data, for example, for analytics.

BACKGROUND

Social media generally refers to virtual interactions in which people create, share, and exchange information and ideas in virtual communities and networks. In social media, people often discuss topics of interest, which can include products, brands, and the like. For example, a social media user can maintain a profile (such as a webpage) on a social media website, and, through the profile, discuss topics of interest, share the topics with other social media users, perform other actions indicating an interest in the topic (such as "liking" the product or brand or "tweeting" about the product or brand), or combinations of them. Information about interests of social media users can be useful, for example, to provide targeted advertisements to the users.

Data collection systems can be connected to server computer systems that host social media websites to obtain the information about the interests of the social media users. Such data collection systems can be included, for example, in enterprise systems. Enterprise systems can be implemented as large-scale application software packages that support business processes, information flows, reporting, and data analytics in complex organizations. Interfaces can be established between the data collection systems and the server computer systems such that the transfer of information about the interests of the social media users occurs automatically, i.e., without or with minimal user intervention. However, structural or functional changes, for example, to hardware or software (or both), on the server computer systems' end can affect the transfer of the information to the data collection systems if the latter is unaware of the changes.

SUMMARY

The present disclosure involves systems, software, and computer-implemented methods for modifying data collection systems responsive to changes to data providing systems.

In general, one innovative aspect of the subject matter described here can be implemented as a method performed by data processing apparatus. A data collection query is received from a data collection computer system. The data collection computer system provided the data collection query to a data providing computer system requesting data from the data providing computer system that satisfies the data collection query. An identifier referencing the data providing computer system is also received from the data collection computer system. One or more computer-readable storage media are searched for a modified data collection query in response to which the data providing computer system is configured to provide data. The modified data collection query is identified in response to searching the one or more computer-readable storage media. The data providing computer system is configured to provide data that satisfies the modified data collection query instead of the data collection query. The modified data collection query is provided to the data providing computer system requesting data from the data providing computer system that satisfies the modified data collection query.

This, and other aspects, can include one or more of the following features. A failure message can be received from the data providing computer system in response to providing the modified data collection query. The steps of searching for modifications to the data collection query, identifying the modified data collection query, and providing the modified data collection query to the data providing computer system can be iteratively performed until data satisfying the modified data collection query is received. Iteratively searching for modifications to the data collection query can include, for each successive search, refining a search query to identify the modified data collection query based on the failure message received in response to a previous search. Iteratively searching for modifications to the data collection query can include performing a first level search for the modifications using a first search query, and, upon failing to identify the modified data collection query in response to which the data providing computer system provides data, performing a second level search for the modifications using a second search query. Refining the search query can include including at least a portion of a failure message in the second search query, the failure message received in response to performing the first level search using the first search query. Performing the first level search can include searching a first host computer system that hosts a website associated with the data providing computer system. Performing the second level search can include searching a second host computer system that hosts a developer forum website in which Application Programming Interfaces (API) of the data providing computer system is discussed. The modified data collection query that resulted in the data satisfying the modified data collection query being received from the data providing computer system can be provided to the data collection computer system. Providing the modified data collection query can include providing parameters included in the modified data collection query to the data collection computer system. The data collection computer system can provide the parameters included in the modified data collection query to an API implemented by the data providing computer system. Iteratively searching for modifications to the data collection query can include searching a different computer-readable storage media for modifications to the data collection query in response to receiving the failure message. Iteratively identifying the modified data collection query can include replacing each modified data collection query with a subsequent modified data collection query identified in response to searching the different computer-readable storage media. The data providing system can be a social networking computer system that hosts the one or more computer-readable storage media to store data and parameters to query the social networking computer system. An execution state of the data collection computer system can be received from the data collection computer system. The execution state can include the data collection query. A local execution state that is identical to the execution state of the data collection computer system can be created. Providing the modified data collection query to the data providing computer system can include executing the local execution state to transmit the modified data collection query to the data providing computer system, receiving a message noting that the data providing computer system successfully provided data in response to receiving the modified data collection query, updating the local execution state to include the modified data collection query, and providing the updated local execution state to the data collection computer system. The data collection query can specify a field of data and the modified data collection query can specify the field of data and at least one additional field of data.

Another innovative aspect of the subject matter described here can be implemented as a system that includes a data collection unit and a data query evaluation unit, each including the same or respective data processing apparatus that executes computer software instructions stored on the same or respective computer-readable storage medium to perform operations described here. A further innovative aspect of the subject matter described here can be implemented as a computer-readable storage medium storing instructions executable by data processing apparatus to perform operations described here.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

The present disclosure involves systems, software, and computer-implemented methods for modifying data collection systems responsive to changes to data providing systems. In some implementations, data providing systems can be implemented by server computer systems that host social media websites. Data collection systems can be implemented by enterprise systems that obtain data from one or more server computer systems including those that host social media websites. The data can include information describing topics of interest (for example, a product, a brand, an event, or other suitable topics) discussed by social media users on the social media websites. The enterprise systems can store the data on databases, for example, in-memory databases.

The data received from a server computer system that hosts a social media website can depend, in part, on a particular format in which the social media website receives, presents, and maintains content (for example, text, audio, video, images, documents) received from users of the social media website. For example, users of a social media website such as Facebook™ (www.facebook.com) can upload text, images, video, and other files and information to the website. A server system that hosts www.facebook.com can receive and store the uploaded content. In another example, a server system that hosts Twitter™ (www.twitter.com) can receive and store tweets. In this manner, different social media websites can receive and store content in different formats.

Each server computer system can implement an Application Programming Interface (API) through which the server computer system can interface with one or more data collection systems implemented by the enterprise systems. The server computer systems can transmit data received and maintained by the server computer system to the one or more data collection systems through the respective APIs. The transmission of requests by a data collection system to a data providing system implemented by and/or included in a server computer system can occur periodically, for example, once every 30 minutes. In such situations, the data collection system may not be monitored for proper transmission of the request and receipt of data in response to the request.

In an example workflow of data transfer, a data collection system can send a data collection query (for example, a hypertext transfer protocol request) to an API of a server computer system hosting a social media website. The data collection query includes a description of the data requested by the data collection system from the server computer system. Usually, the data collection system is aware of a format in which the server computer system expects the data collection query. For example, the server computer system can have previously specified the format of the data collection query. The data collection system can generate the data collection query according to the previously specified format. A data providing system implemented by (for example, included in) the server computer system receives the data collection query, identifies the data specified in the data collection query, and retrieves the data. The data providing system then transmits the data to the data collection system from which the data collection query was received. The data collection system receives the data and, in some cases, a success message indicating a successful receipt and processing of the data collection query.

Structural or functional modifications to software or hardware (or both) of the server computer system, specifically, of the API, may be implemented from time to time. As described below, the modifications can include or result in a modification to a format in which the server computer system expects the data collection query. The server computer system may not communicate this modification to the format to some or any of the data collection systems. In such a situation, when the data collection system transmits a data collection query in a format that has been modified, the API cannot parse the data collection query, and will return a failure message to the data collection system. Because the data collection system can no longer receive data from the data providing system, the data collection system may stop functioning. This can result in a downtime for the data collection system and data loss (i.e., data not collected when the data collection system is down) until the issue is resolved, for example, by a system administrator. In situations in which the data collection system is not monitored, the downtime and data loss can be high.

This disclosure describes a computer system that implements computer-implemented methods to minimize or avoid the downtime and data loss when the data collection system receives a failure message from the data providing system, as described above. As described above, a data collection unit can transmit a data collection query to a data providing computer system. The data collection unit can receive a failure message from the data providing computer system in response to transmitting the data collection query. The computer system described here can implement a data query evaluation unit to which the data collection unit can provide the data collection query in response to receiving the failure message.

In some implementations, the data query evaluation unit can be implemented separately from the data collection unit. Alternatively, the data query evaluation unit and the data collection unit can be components of the same computer system, including as a single component providing functionality for both. The data query evaluation unit can receive, from the data collection unit, the data collection query, an identifier referencing the data providing computer system, a failure message received from the data providing computer system. The data query evaluation unit can generate a local version of the data collection unit, which can be substantially identical to the data collection unit. The data query evaluation unit can execute the local version to perform operations described here.

In some implementations, the data query evaluation unit can search one or more computer-readable storage media (described below) for a modified data collection query in response to which the data providing computer system is configured to provide data. For example, the data query evaluation unit can search for modifications to the API of the server computer system that hosts the social media website. The data query evaluation unit can identify the modified data collection query in response to searching the one or more computer-readable storage media. The data query evaluation unit can execute the local version to provide the modified data collection query to the data providing computer system requesting data from the data providing computer system that satisfies the modified data collection query.

In some instances, a modified data collection query that the data query evaluation unit identifies after only can be in a format in response to which the data providing system can successfully provide data. In other instances, however, the modified data collection query that the data query evaluation unit identifies after the first search may not be in the proper format. That is, when the data query evaluation unit executes the local version to provide the modified data collection query identified after the first search to the data providing computer system, the local version may receive a failure message. In response, the data query evaluation unit can iteratively search for modifications to the data collection query, identify the modified data collection query, and execute the local version to provide the modified data collection query to the data providing computer system. The data query evaluation unit can repeat the iterations until the local version receives data satisfying the modified data collection query. As described below, when iteratively searching for modifications to the data collection query, for each successive search, the data query evaluation unit can refine the modified data collection query based, in part, on the failure message received in response to a previous search.

Thus, either after the first search or after iteratively searching, the data query evaluation unit can identify the modified data collection query based on from which modified query the local version receives a success message. The data query evaluation unit can then provide a state of the local version, including the modified data collection query, to the data collection unit. The data collection unit can provide the modified data collection query to the data providing computer system, and receive data that satisfies the modified data collection query in response to providing the modified data collection query. The data collection unit can provide the received data for storing in a computer-readable database. In some implementations, a data collection system that implements the data collection unit can store the data in an in-memory database.

Implementations of the subject matter described here can provide one or more of the following potential advantages. The computer system described here can automatically (i.e., without user intervention) be implemented when a data collection system receives a failure message from a data providing system. Doing so can decrease or eliminate a need for manual intervention, for example, by an administrator. The techniques described here can also decrease or eliminate a downtime experienced by a data collection system. The techniques can also decrease or eliminate data loss due to the downtime.

Figure 1:
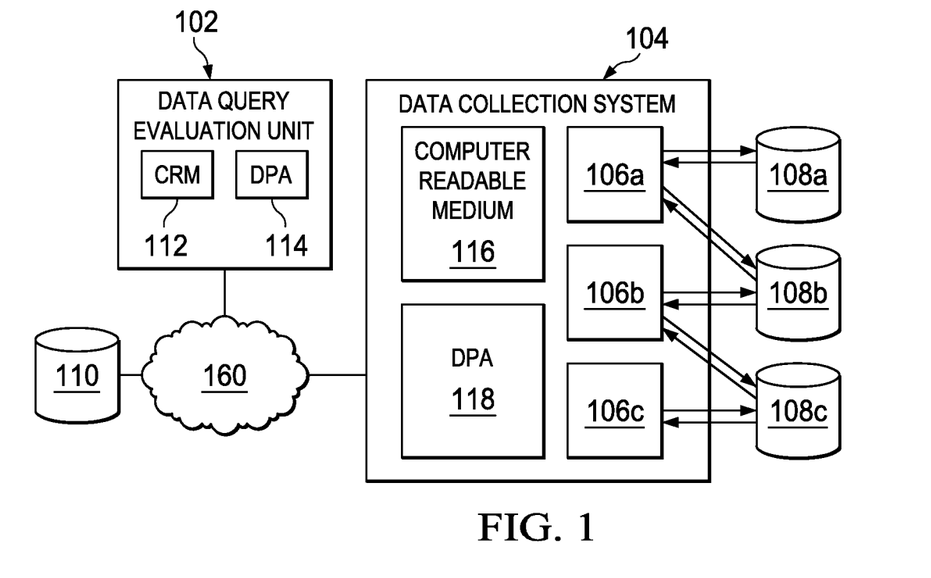
FIG. 1 illustrates an example of a data query evaluation unit connected to a data collection system that implements multiple data collection units.

FIG. 1 illustrates an example of a data query evaluation unit 102 connected to a data collection system 104 that implements multiple data collection units (for example, a first data collection unit 106a, a second data collection unit 106b, a third data collection unit 106c). The data collection system 104 can implement each data collection unit as a computer software application that includes computer instructions stored on a computer-readable medium (for example, computer-readable medium 116) and executable by data processing apparatus (for example, data processing apparatus 118). For example, the data collection system 104 can include an enterprise system that implements the data collection units to collect data, for example, for analytics.

The data collection system 104 can be connected to one or more data providing units (for example, a first data providing unit 108a, a second data providing unit 108b, a third data providing unit 108c). For example, one or more data providing units can be included in a server computer system that hosts a social media website. The server computer system can implement each data providing unit as a computer software application that includes computer instructions stored on a computer-readable medium and executable by data processing apparatus.

In some implementations, each data collection unit can be connected to a corresponding data providing unit. Alternatively, or in addition, one or more data collection units can be connected to one or more data providing units. The data collection system 104 and the data providing units can be connected by one or more wired or wireless networks, for example, the Internet. In some implementations, the data collection system 104 can implement each data collection unit (for example, data collection unit 106a) to interface with an API, for example, Representational State Transfer (REST) API, of a data providing unit (for example, data providing unit 108a).

In some implementations, the data collection unit 106a can transmit a data collection query to the data providing unit 108oa requesting data that satisfies the data collection query. The format of the query can be one in which the data providing unit 108a expects the query. For example, the data providing unit 108a can have previously specified that the data collection query specify two fields of data, such as a user's geographical location and the user's age. The data collection unit 106a can generate the query to include the two fields and transmit the query to the data providing unit 108a, for example, as an hypertext transmission protocol (HTTP) request. Upon receiving the query from the data collection unit 106a, the data providing unit 108a can parse the query to determine if the format of the query matches the previously specified format. If the formats match, then the data providing system 108a can provide the requested data (in this example, the user's geographical location and age) to the data collection unit 106a, for example, in an extensible markup language (XML) format.

The data collection system 104 can transmit the received data to a computer-readable storage medium (for example, an in-memory database 110) for storage. In some implementations, the data collection unit 106a can parse the received data into a specific format, such as field-value pairs, and push the data to the computer-readable storage medium. After a period of time (for example, 30 minutes) has expired or in response to user input (or both), the data processing unit 106a can repeat the afore-described process to request data. The period of time can be specified, for example, by a system administrator or can be encoded in each data collection unit.

As described above, structural or functional modifications implemented by the server computer system to the data providing unit 108a can result in a modification to the format in which the data providing unit 108a expects to receive a query from a data collection unit. For example, the data providing unit 108a can expect to receive a query that includes at least one additional field of data relative to the previously specified two fields, for example, a user's geographical location, age, and gender. The data collection unit 106a may not be aware of the modification, and may send a query that includes two fields (i.e., location and age), whereas the data providing unit 108a is expecting a query that includes three fields (i.e., location, age, and gender). Because the data providing unit 108a cannot parse the query received from the data collection unit 106a, the data providing unit 108a transmits an error message (for example, a "data not found" message or "bad request" message).

The data query evaluation unit 102 receives the data collection query that the data collection unit 106a provided to the data providing unit 108a. The data collection unit 106a or the data collection system 104 can provide the data collection query to the data query evaluation unit 102. In addition, the data query evaluation unit 102 can receive an identifier referencing the data providing unit 108a. For example, the data collection unit 106a can provide a Uniform Resource Locator (URL) that references the social media website hosted by the server computer system that includes the data providing unit 108a. The data collection unit 106a can also provide the failure message received from the data providing unit 108a.

Upon receiving the data collection query and the identifier, the data query evaluation unit 102 can identify an operational state of the data collection unit 106a and generate a local version of the data collection unit 106a. As shown in FIG. 1, the data query evaluation unit 102 and the data collection system 104 can be two separate computer systems. In such implementations, the local version of the data collection unit 106a can reside on the data query evaluation unit 102 separately from the data collection system 104. Alternatively, the data query evaluation unit 102 and the data collection system 104 can be components of the same computer system. In such implementations, the local version of the data collection unit 106a can reside in the same computer system as the data collection unit 106a. In any of the implementations, the data query evaluation unit 102 can implement the local version of the data collection unit 106a in a manner that is identical to which the data collection system 104 implements the data collection unit 106a. In addition, the data collection system 104 can continue to implement other data collection units even if the data collection unit 106a has stopped functioning.

The data query evaluation unit 102 can search one or more computer-readable storage media for a modified data collection query in response to which the data providing unit 108a is configured to provide data. The data query evaluation unit 102 can identify the modified data collection query in response to searching the one or more computer-readable storage media. The modified data collection query has the modified format in which the data providing unit 108a expects to receive the query. To determine that the data providing unit 108a can provide data that satisfies the modified data collection query, the data query evaluation unit 102 can implement the local version of the data collection unit 106a, as described below. Upon identifying the modified data collection query, the data query evaluation unit 102 can provide the modified data collection query to the data collection system 104. The data collection system 104 can modify (for example, overwrite) the data collection unit 106a according to the local version received from the data collection unit 102. The modified data collection unit 106a is configured to transmit the modified data collection query to the data providing unit 108a. The workflow for sending a query to and receiving data from the data providing unit 108a can then resume.

Figure 2:
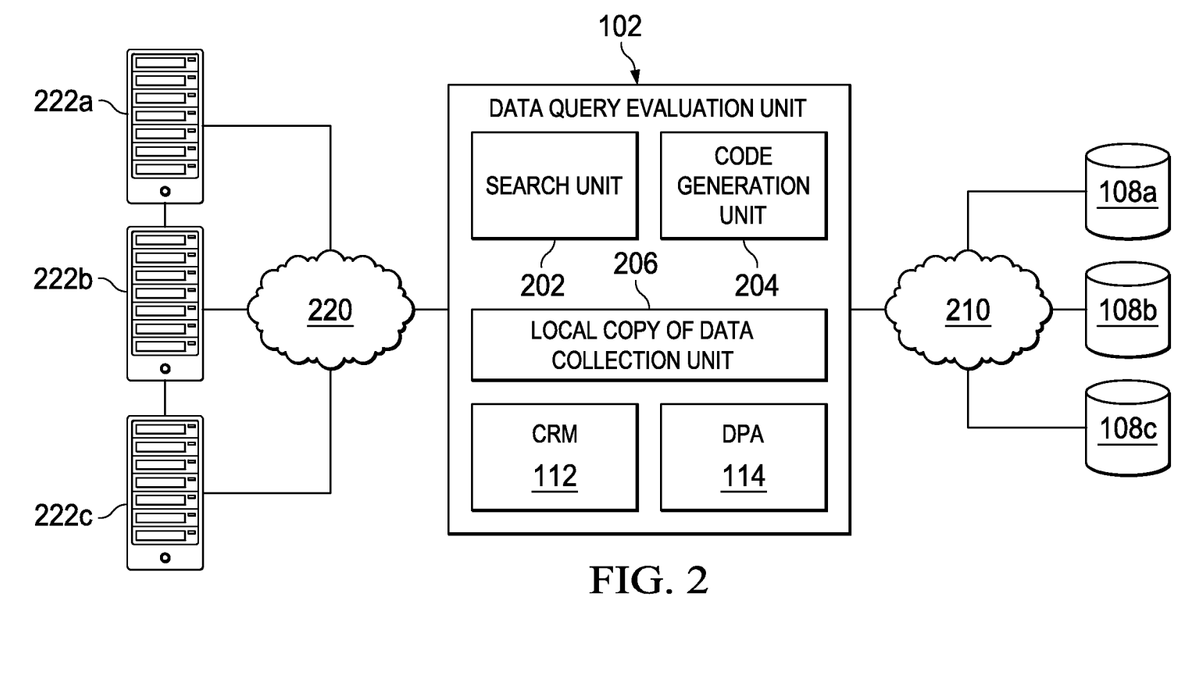
FIG. 2 illustrates an example of a data query evaluation unit implementing a local version of a data collection unit.

FIG. 2 illustrates an example of the data query evaluation unit 102 implementing the local version 206 of the data collection unit 106a. In addition to the local version 206 of the data collection unit 106a, the data query evaluation unit 102 can include a search unit 202 and a code generation unit 204. The data query evaluation unit 102 can implement each of the search unit 202, the code generation unit 204, the local version 206 (and one or more other components of the data query evaluation unit 102) as a computer software application including computer instructions stored on a computer-readable medium (for example, the medium 112) and executable by data processing apparatus (for example, the data processing apparatus 114) to perform respective operations.

The data query evaluation unit 102 can implement the search unit 202 to search for and identify modifications that may have been performed to a format of the query that the API of the data providing unit 108a expects to receive. In general, the data query evaluation unit 102 can search one or more host computer systems (for example, host computer system 222a, host computer system 222b, host computer system 222c) connected to the data query evaluation unit 102 over one or more networks 220, for example, the Internet. The host computer systems can include the server computer system that hosts the particular social media website, a server computer system that hosts developer forums such as those discussed below, server computer systems hosted by search engine websites, one or more databases that store data hosted by the host computer systems (for example, indexed databases) or combinations of them.

In some implementations, in a first level search, the data query evaluation unit 102 can perform a search of one more computer-readable storage media included in a host computer system 222a that hosts the social media website from which the data collection unit 106a requested data. Depending on a result of the search, at a second level, the data query evaluation unit 102 can perform a focused search of one or more host computer systems known to host resources related to the social media website. Depending on a result of the foregoing search or searches, at a third level, the data query evaluation unit 102 can further perform a general search of resources hosted by multiple host computer systems or indexed databases or combinations of them. In this manner, the data query evaluation unit 102 can iteratively search for modifications to the data collection query. As described below, for each successive search, the data query evaluation unit 102 can refine a search query to identify the modified data collection query based on the failure message received in response to a previous search.

To search the host computer system 222*a* that hosts the website associated with the data providing unit 108*a*, the search unit 102 can search a specific API at the developer's end or webpages hosted by the website, such as, "frequently asked questions" pages in which the host has published information describing modifications to data collection search queries, or combinations of them. In response to the first level search, the search unit 102 can identify modifications to the data collection query included in the local version 206. The data query evaluation unit 102 can execute the code generation unit 204 to modify the data collection query included in the local version 206 based on the modifications identified by the search unit 202. In some implementations, the code generation unit 204 can be a pattern changer that finds a pattern in the data collection query that may result in the failure and modify the pattern according to the modifications identified by the search unit 202.

The local version 206 can receive a modified data collection query generated by the code generation unit 204 and provide the modified query to the data providing unit 108*a*, for example, over one or more wired or wireless networks 210 such as the Internet. If a format of the modified data collection query matches a modified format in which the data providing unit 108*a* expects to receive the query, then the data providing unit 108*a* will transmit a success message (or data or both) to the local version 206. The data query evaluation unit 102 will then transmit a state of the local version 206 to the data collection unit 106*a*, and the search can end.

If, however, the format of the modified data collection query does not match a modified format in which the data providing unit 108*a* expects to receive the query, then the data providing unit 108*a* will transmit a failure message to the local copy 206 triggering a second level search. In the second level search, the data query evaluation unit 102 can execute the search unit 202 to search one more computer-readable storage media included in a second host computer system that hosts a developer forum website in which the API of the data providing unit 108*a* is discussed. For example, at least a portion of the failure message that the local version 206 receives in response to the first level search can include some information using which the search unit 202 can identify the developer forum website (or websites) in which information about the data collection query associated with the data providing unit 108*a* is discussed. Alternatively, or in addition, the search unit 202 can store identities of one or more developer forums that usually discuss data collection queries. The search unit 202 can modify the first level search based on the information included in the failure message or based on the stored identities or combinations of them. In some implementations, the search unit 202 can search server computer systems that host search engines using keywords directed to developer forums.

In the second level search, the search unit 202 can identify parameters to modify the modified data collection query from the first level search. The search unit 202 can provide the parameters to the code generation unit 204, which can generate a modified data collection query that has been further modified relative to the modified data collection query from the first level search. Similarly to the first level search, the local version 206 can receive the modified data collection query from the code generation unit 204 and provide the modified data collection query that includes the parameters to the data providing unit 108*a* (for example, to the API of the unit 108*a*) through the one or more networks 210. Also similarly to the first level search, if the modified data collection query matches a modified format in which the data providing unit 108*a* expects to receive the query, then the data providing unit 108*a* will transmit a success message (or data or both) to the local version 206. The data query evaluation unit 102 will then transmit a state of the local version 206 to the data collection unit 106*a*, and the search can end.

If, however, the format of the modified data collection query continues to not match a modified format in which the data providing unit 108*a* expects to receive the query, then the data providing unit 108*a* will transmit another failure message to the local copy 206 triggering a third level search. In the third level search, the data query evaluation unit 102 can execute the search unit 202 to search one more computer-readable storage media included a third host computer system that hosts a search engine. For example, the search unit 202 can store identities of one or more search engines that search resources hosted by various entities on databases such as indexed databases. The search unit 202 can perform the third level search based on the information included in the failure message or based on the stored identities or combinations of them. The data query evaluation unit 102 can repeat this iterative process until the local version 206 receives a success message from the data providing unit 108*a*.

In this manner, by performing the searches, the data query evaluation unit 102 can determine modifications to the data collection query that the API of the data providing unit 108*a* expects to receive and in response to which, the data providing unit 108*a* can provide data requested by the data collection unit 106*a*. Having identified the modification to the query, the data query evaluation unit 102 can modify the local version 206 to be able to transmit the modified data collection query. The data query evaluation unit 102 can then transmit a state of the local version 206 that includes the modified data collection query to the data collection system 104, which can modify the data collection unit 106*a* to mirror the local version 206. The data collection unit 106*a* then commences transmitting the modified query to the data providing unit 108*a*.

The data query evaluation unit 102 and the data collection system 104 can implement the techniques described above for any of the data collection units that communicate with any of the data providing units. The data providing units can be included in server computer systems that host websites other than social media websites. For example, the server computer system can host any website that receives and maintains data which the data collection system 104 can collect, for example, for analytics.

In the example implementation described above, the search unit 202 searched the host computer system that hosts the social media website in the first level search, host computer systems that host developer forums in a second level search, and other host computer systems in a more general third level search. In some implementations, sequence of the host computer systems searched can change. For example, the data collection unit 106*a* can be connected to both the data providing system 108*a* and the data providing system 108*b*, both of which are included in the server computer system associated with the same social media website. When the data collection unit 106*a* received a failure message from the data providing unit 108*a*, the data query evaluation system 102 can have executed the search unit 202 at a first level to search the host computer system that hosts the social media website. The first level may have failed as described above necessitating a second search.

In parallel, the data collection unit 106*a* can have received a failure message from the data providing unit 108*b*. Because a first level search associated with the data collection unit 106*a* had previously failed, the data query evaluation system 102 can first search the host computer systems that host the developer forums for the data collection unit 106*b*. In this manner, the data query evaluation unit 102 can learn to optimize the searches based on the successes or failures of previous searches, thereby decreasing a number of iterative searches.

Figure 3:
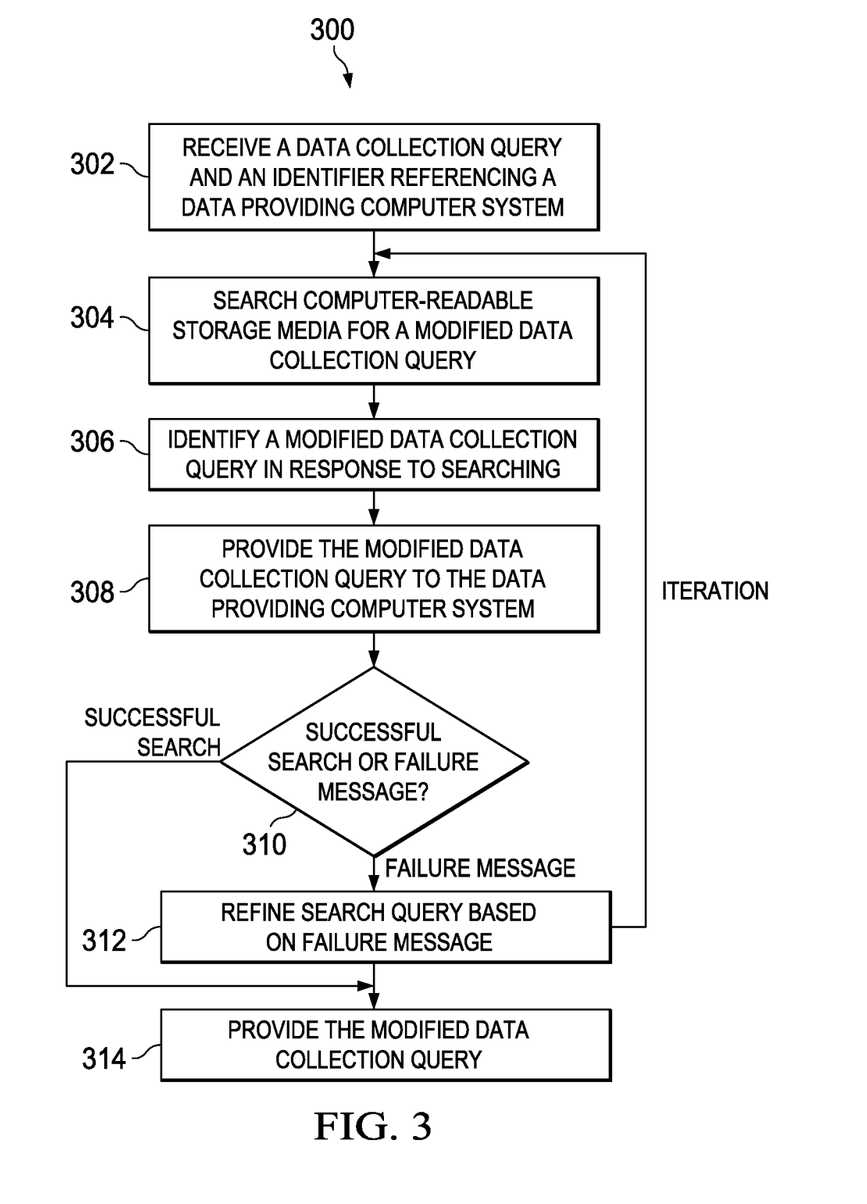
FIG. 3 is a flowchart of an example process for modifying data collection systems responsive to changes to data providing systems.

FIG. 3 is a flowchart of an example process 300 for modifying data collection systems responsive to changes to data providing systems. The process 300 can be implemented as computer instructions stored on computer-readable media (for example, the computer-readable medium 116) and executable by data processing apparatus (for example, data processing apparatus 118). For example, the process 300 can be implemented by the data query evaluation unit 102.

At 302, a data collection query and an identifier referencing a data providing computer system can be received. In one instance, the data collection unit 106*a* can have provided the query to the data providing unit 108*a* requesting data from the data providing unit 108*a* that satisfies the query. The identifier can reference the data providing unit 108*a*.

At 304, one or more computer-readable storage media can be searched for a modified data collection query in response to which the data providing computer system is configured to provide data. At 306, the modified data collection query can be identified in response to searching the one or more computer-readable storage media. The data providing computer system can be configured to provide data that satisfies the modified data collection query instead of the data collection query. At 308, the modified data collection query can be provided to the data providing computer system requesting data from the data providing computer system that satisfies the modified data collection query.

At 310, a check may be performed to determine whether providing the modified data collection query at 308 resulted was successful or failed. If a failure occurred (decision branch "Failure Message"), then, at 312, the search query can be refined based on the failure message, and the search of computer-readable storage media, identification of the modified data collection query, and the provision of the modified data collection query to the data providing computer system (steps 304, 306, and 308) can be iteratively repeated. If a success (decision branch "Successful Search") then, at 314, the modified data collection query can be provided, for example, to data collection unit 106*a* to transmit to data providing unit 108*a*.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) monitor, for displaying information to the user, and a keyboard, a pointing device, for example, a mouse or a trackball, or a microphone and speaker (or combinations of them) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, from a data collection computer system, a data collection query provided by the data collection computer system to a data providing computer system requesting data from the data providing computer system that satisfies the data collection query, and an identifier referencing the data providing computer system, wherein the data collection query is received after the data collection computer system fails to receive data from the data providing computer system using the data collection query;

in response to receiving the data collection query and the identifier, automatically searching one or more computer-readable storage media for an initial modified data collection query corresponding to the data collection query, wherein the data providing computer system is configured to provide data that satisfies the initial modified data collection query instead of the data collection query;

automatically identifying the initial modified data collection query in response to searching the one or more computer-readable storage media;

providing the initial modified data collection query to the data providing computer system requesting data from the data providing computer system that satisfies the initial modified data collection query;

in response to receiving, from the data providing computer system, data satisfying the initial modified data collection query, providing the initial modified data collection query to the data collection computer system, wherein the data collection computer system requests data from the data providing computer system using the provided initial modified data collection query; and in response to receiving, from the data providing computer system, a first failure message after providing the initial modified data collection query:
 iteratively searching, without user intervention, the one or more computer-readable storage media for additional modifications to the initial modified data collection query, automatically identifying an updated modified data collection query, and providing the updated modified data collection query to the data providing computer system until data satisfying the updated modified data collection query is received, wherein iteratively searching for additional modifications to the initial modified data collection query comprises performing a first level search for the additional modifications using a first search query, and, upon failing to identify the updated modified data collection query in response to receiving a second failure message from the data providing computer system, performing a second level search for the additional modifications using a second search query, wherein the second search query includes at least a portion of the second failure message received in response to performing the first level search using the first search query, the second failure message different from the first failure message; and
 providing, to the data collection computer system, the updated modified data collection query, wherein the data collection computer system requests data from the data providing computer system using the provided updated modified data collection query.

2. The method of claim 1, wherein iteratively searching for additional modifications to the initial modified data collection query further comprises, for each successive search, refining a search query to identify the updated modified data collection query based on the failure message received in response to a previous search.

3. The method of claim 1, wherein performing the first level search comprises searching a first host computer system that hosts a website associated with the data providing computer system, and wherein performing the second level search comprises searching a second host computer system that hosts a developer forum website in which Application Programming Interfaces (API) of the data providing computer system is discussed.

4. The method of claim 1, wherein providing the initial modified data collection query or the updated modified data collection query to the data collection computer system comprises providing parameters included in the initial modified data collection query or the updated modified data collection query to the data collection computer system, wherein the data collection computer system provides the parameters included in the initial modified data collection query or the updated modified data collection query to an application programming interface (API) implemented by the data providing computer system.

5. The method of claim 1, wherein iteratively searching for additional modifications to the initial modified data collection query comprises searching a different computer-readable storage media for additional modifications to the initial modified data collection query in response to receiving the failure message.

6. The method of claim 5, wherein iteratively identifying the updated modified data collection query comprises replacing each updated modified data collection query with a subsequent updated modified data collection query identified in response to searching the different computer-readable storage media.

7. The method of claim 1, wherein the data providing system is a social networking computer system that hosts the one or more computer-readable storage media to store data and parameters to query the social networking computer system.

8. The method of claim 1, further comprising:
 receiving, from the data collection computer system, an execution state of the data collection computer system, the execution state including the data collection query; and
 creating a local execution state that is identical to the execution state of the data collection computer system.

9. The method of claim 8, wherein providing the initial modified data collection query or the updated modified data collection query to the data providing computer system comprises:
 executing the local execution state to transmit the initial modified data collection query or the updated modified data collection query to the data providing computer system;
 receiving a message noting that the data providing computer system successfully provided data in response to receiving the initial modified data collection query or the updated modified data collection query;
 updating the local execution state to include the initial modified data collection query or the updated modified data collection query; and
 providing the updated local execution state to the data collection computer system.

10. The method of claim 1, wherein the data collection query specifies a field of data and the initial modified data collection query or the updated modified data collection query specifies the field of data and at least one additional field of data.

11. A system comprising:
 a data collection sub-system including a first computer-readable medium and at least one processor for executing computer software instructions stored on the first computer-readable medium to perform operations comprising:
  i. transmitting a data collection query to a data providing computer system, receiving a failure message from the data providing computer system in response to transmitting the data collection query, and
  ii. providing, to a data query evaluation sub-system, the data collection query, an identifier referencing the data providing computer system, and the failure message in response to receiving the failure message; and
the data query evaluation sub-system, implemented separately from the data collection sub-system, the data query evaluation sub-system including a second computer-readable medium and at least one processor for executing computer software instructions stored on the second computer-readable medium to perform operations comprising:
  i. receiving, from the data collection sub-system, the data collection query, the identifier referencing the data providing computer system, and the failure message, wherein the data collection query is received after the data collection sub-system receives the failure message from the data providing computer system in response to transmitting the data collection query;
  ii. generating, at the data query evaluation sub-system, a local version of the data collection sub-system, the local version being substantially identical to the data collection sub-system, the local version executable to transmit the data collection query to the data providing computer system;
  iii. in response to receiving the data collection query and the identifier, automatically searching one or more computer-readable storage media for an initial modified data collection query corresponding to the data collection query, wherein the data providing computer system is configured to provide data that satisfies the initial modified data collection query instead of the data collection query, wherein searching the one or more computer-readable storage media includes searching the one or more computer-readable storage media using a search query, the search query including at least a portion of the failure message;
  iv. automatically identifying the initial modified data collection query in response to searching the one or more computer-readable storage media;
  v. executing the local version to provide the initial modified data collection query to the data providing computer system requesting data from the data providing computer system that satisfies the initial modified data collection query;
  vi. in response to receiving, at the local version and from the data providing computer system, data satisfying the initial modified data collection query, providing the initial modified data collection query to the data collection sub-system, wherein the data collection sub-system requests data from the data providing computer system using the provided initial modified data collection query; and
  vii. in response to receiving, at the local version and from the data providing computer system, a failure message after providing the initial modified data collection query:

a) iteratively searching, without user intervention, the one or more computer-readable storage media for additional modifications to the initial modified data collection query, automatically identifying an updated modified data collection query, and executing the local version to provide the updated modified data collection query to the data providing computer system until the local version receives data satisfying the updated modified data collection query, wherein iteratively searching for additional modifications to the initial modified data collection query further comprises, for each successive search, refining a search query to identify the updated modified data collection query based on the failure message received in response to a previous search; and
  b) providing, to the data collection sub-system, the updated modified data collection query, wherein the data collection sub-system requests data from the data providing computer system using the provided updated modified data collection query;
wherein the data query evaluation sub-system is part of the system.

12. The system of claim 11, wherein the operations implemented by the data collection sub-system further comprise executing the data collection sub-system to:
  receive the initial modified data collection query or the updated modified data collection query from the data query evaluation sub-system;
  provide the initial modified data collection query or the updated modified data collection query to the data providing computer system;
  receive data that satisfies the initial modified data collection query or the updated modified data collection query in response to providing the modified data collection query; and
  store the data in a computer-readable database, wherein the database is an in-memory database.

13. A non-transitory computer-readable medium storing instructions executable by data processing apparatus to perform operations comprising:
  receiving, from a data collection computer system, a data collection query provided by the data collection computer system to a data providing computer system requesting data from the data providing computer system that satisfies the data collection query, an identifier referencing the data providing computer system, and a failure message, wherein the failure message was received at the data collection computer system after providing the data collection query to the data providing computer system, and the data collection query is received after the data collection computer system fails to receive data from the data providing computer system using the data collection query;
  in response to receiving the data collection query and the identifier, automatically searching one or more computer-readable storage media for an initial modified data collection query corresponding to the data collection query, wherein the data providing computer system is configured to provide data that satisfies the initial modified data collection query instead of the data collection query, wherein searching the one or more computer-readable storage media includes searching the one or more computer-readable storage media using a search query, the search query including at least a portion of the failure message;

automatically identifying the initial modified data collection query in response to searching the one or more computer-readable storage media; and providing the initial modified data collection query to the data providing computer system requesting data from the data providing computer system that satisfies the initial modified data collection query;

in response to receiving, from the data providing computer system, data satisfying the initial modified data collection query, providing the initial modified data collection query to the data collection computer system, wherein the data collection computer system requests data from the data providing computer system using the provided initial modified data collection query; and in response to receiving, from the data providing computer system, a failure message after providing the initial modified data collection query:

iteratively searching, without user intervention, the one or more computer-readable storage media for additional modifications to the initial modified data collection query, automatically identifying an updated modified data collection query, and providing the updated modified data collection query to the data providing computer system until data satisfying the updated modified data collection query is received; and providing, to the data collection computer system, the updated modified data collection query, wherein the data collection computer system requests data from the data providing computer system using the provided updated modified data collection query.

14. The medium of claim 13, wherein iteratively searching for additional modifications to the initial modified data collection query further comprises, for each successive search, refining a search query to identify the updated modified data collection query based on the failure message received in response to a previous search.

15. The medium of claim 14, wherein iteratively searching for additional modifications to the initial modified data collection query comprises performing a first level search for the additional modifications using a first search query, and, upon failing to identify the updated modified data collection query in response to which the data providing computer system provides data, performing a second level search for the additional modifications using a second search query, wherein refining the search query comprises including in the second search query, at least a portion of a failure message received in response to performing the first level search using the first search query.

* * * * *